United States Patent
Nakanishi

(10) Patent No.: US 7,522,093 B2
(45) Date of Patent: Apr. 21, 2009

(54) RADAR FOR DETECTING A TARGET BY TRANSMITTING AND RECEIVING AN ELECTROMAGNETIC-WAVE BEAM

(75) Inventor: Motoi Nakanishi, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/924,677

(22) Filed: Oct. 26, 2007

(65) Prior Publication Data

US 2008/0180312 A1    Jul. 31, 2008

Related U.S. Application Data

(63) Continuation of application No. PCT/JP2006/307542, filed on Oct. 4, 2006.

(30) Foreign Application Priority Data

May 13, 2005    (JP)    ............... 2005-141931

(51) Int. Cl.
    *G01S 13/34*    (2006.01)
    *G01S 7/292*    (2006.01)

(52) U.S. Cl. ...................................... 342/91

(58) Field of Classification Search ............ 342/17, 342/19, 70–72, 91–93, 99, 128, 159, 175, 342/205

See application file for complete search history.

(56) References Cited

U.S. PATENT DOCUMENTS

| | | | |
|---|---|---|---|
| 7,460,058 B2 * | 12/2008 | Nakanishi | .............. 342/192 |
| 2007/0018886 A1 * | 1/2007 | Watanabe et al. | .............. 342/91 |
| 2008/0094274 A1 * | 4/2008 | Nakanishi | .............. 342/91 |
| 2008/0218406 A1 * | 9/2008 | Nakanishi | .............. 342/192 |

FOREIGN PATENT DOCUMENTS

| | | | |
|---|---|---|---|
| EP | 1881343 A1 * | 1/2008 | |
| EP | 1881344 A1 * | 1/2008 | |
| JP | 04-204189 | 7/1992 | |
| JP | 06-160512 | 6/1994 | |
| JP | 07-110373 | 4/1995 | |
| JP | 2002-168947 | 6/2002 | |
| JP | 2003248893 A * | 9/2003 | |
| JP | 2004-170183 | 6/2004 | |
| JP | 2004-264258 | 9/2004 | |
| JP | 2004-347362 | 12/2004 | |

OTHER PUBLICATIONS

International Search Report PCT/JP2006/307542 dated May 2, 2006.
Written Opinion PCT/JP2006/307542 dated May 2, 2006.

* cited by examiner

*Primary Examiner*—Dan Pihulic
(74) *Attorney, Agent, or Firm*—Dickstein, Shapiro, LLP.

(57) ABSTRACT

A radar that detects whether spike noise due to an interference with a transmission signal from an object vehicle is superimposed on a beat signal obtained from the transmission signal and a reception signal. When the spike noise is detected, a threshold for extracting a peak from a frequency spectrum is temporarily increased. Normally, a threshold (TH0) is set not so as to extract background noise as a target peak. When the spike noise is detected, a noise floor level (NFL) of the frequency spectrum is determined on the basis of the maximum absolute value of the spike noise, and a threshold (TH1) higher by a predetermined amount ΔL than the threshold TH0 is set. This allows a proper target peak to be accurately extracted without mistakenly extracting many peaks caused by the noise as the target peaks.

6 Claims, 16 Drawing Sheets

(A)

(B)

(C)

(A)

(B)

(C)

(D)

US 7,522,093 B2

RADAR FOR DETECTING A TARGET BY TRANSMITTING AND RECEIVING AN ELECTROMAGNETIC-WAVE BEAM

CROSS REFERENCE TO RELATED APPLICATIONS

The present application is a continuation of International Application No. PCT/JP2006/307542, filed Oct. 4, 2006, which claims priority to Japanese Patent Application No. JP2005-141931, filed May 13, 2005, the entire contents of each of these applications being incorporated herein by reference in their entirety.

FIELD OF THE INVENTION

The present invention relates to an FM-CW radar for detecting a target by transmitting and receiving an electromagnetic-wave beam.

BACKGROUND OF THE INVENTION

An FM-CW radar using a millimeter wave, which is one of electric waves, for use as a radar mounted on a vehicle has had a problem of an interference with a radar mounted on an object vehicle. That is, as shown in part (A) of FIG. 4, when a subject vehicle MM on which the type of radar to scan a beam in the azimuthal direction is mounted and an object vehicle OM1 face each other, spike noise is superimposed (mixed) on a beat signal at a timing when the beat is generated between a reception signal directly received from the object vehicle OM1 and a transmission signal of the subject vehicle MM. As shown in part (B) of FIG. 4, when the subject vehicle MM on which the type of radar to perform beam scanning is mounted and an object vehicle OM2 on which a monopulse radar is mounted face each other, spike noise is also superimposed on a beat signal obtained from a transmission signal and a reception signal. Furthermore, as shown in part (C) of FIG. 4, when an object vehicle OM4 traveling in front of the subject vehicle MM and an object vehicle OM3 that transmits an electric wave to the object vehicle OM4 exist, a signal that is transmitted from a radar mounted on the object vehicle OM3 and then reflected on the object vehicle OM4 is superimposed on a reception signal received by a radar of the subject vehicle MM. Accordingly, spike noise is superimposed on a beat signal.

A method for detecting such spike noise is disclosed in Patent Document 1.

Patent Document 1: Japanese Unexamined Patent Application Publication No. 6-160512

In the method disclosed in Patent Document 1, after a frequency spectrum of a beat signal is determined using FFT, the presence or absence of an interference is detected by determining whether a noise floor level of the frequency spectrum is increased or not. When it is determined that an interference exists, a transmission frequency is changed. The change of the transmission frequency is repeated until no interference is detected (the influence of the interference becomes negligible).

However, because an FM-CW radar requires a wide frequency band for frequency modulation, the frequency change is substantially difficult in terms of oscillator characteristics or legislation. Additionally, a target cannot be detected while the frequency change is performed. Furthermore, for example, because repetitive periods of scanning a beam in the azimuthal direction becomes unequal due to the performing of the frequency change, a function of examining the correlation between frequency spectrums of beat signals for beams in the same azimuth and tracing a target with recognition of targets having a strong correlation as a single target is also impeded. That is, the target trace is interrupted every time the frequency change is performed.

SUMMARY OF THE INVENTION

It is an object of the present invention to provide a radar that can solve the disadvantages of an interference without changing the frequency of a transmission signal.

In order to solve the disadvantages above, the radar according to the present invention is configured as described below.

(1) A radar including electromagnetic wave transmitting and receiving means for transmitting an electromagnetic wave having repetition of modulation intervals in which a frequency gradually changes in a predetermined frequency range with time and for receiving a reflected wave of the electromagnetic wave from a target, means for determining a frequency spectrum of a beat signal obtained from a transmission signal and a reception signal, and means for detecting information concerning the target on the basis of data exceeding a noise threshold among data defining the frequency spectrum includes means for detecting whether spike noise is superimposed on the beat signal, and noise threshold setting means for increasing the noise threshold in a case where the superimposition of the spike noise is detected.

(2) The noise threshold setting means may estimate a noise floor level of the frequency spectrum, for example, on the basis of the maximum absolute value (amplitude) of the beat signal, and set a value obtained by adding a predetermined value to the noise floor level or a value obtained by multiplying the noise floor level by a predetermined coefficient as the noise threshold.

(3) A radar including electromagnetic wave transmitting and receiving means for transmitting an electromagnetic wave having repetition of modulation intervals in which a frequency gradually changes in a predetermined frequency range with time and for receiving a reflected wave of the electromagnetic wave from a target, means for determining a frequency spectrum of a beat signal obtained from a transmission signal and a reception signal, and means for detecting information concerning the target on the basis of data exceeding a noise threshold among data defining the frequency spectrum includes noise threshold setting means for estimating a noise floor level of the frequency spectrum on the basis of the maximum absolute value of the beat signal and setting a value obtained by adding a predetermined value to the noise floor level or a value obtained by multiplying the noise floor level by a predetermined coefficient as the noise threshold.

(4) The noise threshold setting means may set a stationary noise threshold in accordance with a frequency of the frequency spectrum and set the larger one of the value obtained by adding the predetermined value to the noise floor level or the value obtained by multiplying the noise floor level by the predetermined coefficient and the stationary noise threshold as the noise threshold, the noise floor level being estimated on the basis of the amplitude of the beat signal.

(5) The electromagnetic wave transmitting and receiving means may transmit and receive beams of the electromagnetic wave in a plurality of different azimuths, such as by scanning the beams of the electromagnetic wave in the azimuthal direction, the transmission and reception being performed for each of the beams, and the radar may include data processing means for detecting, when a peak exceeding the noise threshold is included in the frequency spectrum of a beam adjacent to a specified beam, the presence or absence of a peak, which is below the noise threshold at substantially the same frequency of the peak in the beam adjacent to the specified beam, in the specified beam and for performing, when the presence of the peak in the specified beam is detected, processing in accordance with regarding the peak in the specified beam as being caused by the target.

Advantages of Invention (1) When it is detected that the spike noise is superimposed on the beat signal, the noise threshold is increased. This can prevent many peaks caused by the noise from exceeding the stationary noise threshold even when the noise floor level of the frequency spectrum of the beat signal is increased due to the superimposition of the spike noise. Accordingly, many peaks caused by the noise do not have to be processed in the later processing, and a peak (target peak) generated by receiving the reflected wave from a proper target can be processed effectively.

(2) By estimating the noise floor level of the frequency spectrum on the basis of the maximum absolute value (amplitude) of the spike noise included in the beat signal and setting the value obtained by adding the predetermined value to the noise floor level or multiplying the noise floor level by the predetermined coefficient as the noise threshold, false detection, which is due to the increase of the threshold, of many peaks caused by the noise can be prevented effectively. Additionally, because the noise threshold is not increased more than necessary, the target peak generated by receiving the reflected wave from a remote target can be processed effectively.

(3) By estimating the floor level of the frequency spectrum on the basis of the maximum absolute value of the beat signal, without means for detecting whether the spike noise is superimposed on the beat signal or not, the noise threshold can be set properly, and the processing throughput can be decreased resulting in the acceleration of the processing.

(4) By setting the stationary noise threshold in accordance with a frequency of the frequency spectrum and setting the larger one of the value obtained by adding the predetermined value to the noise floor level, which is estimated on the basis of the amplitude of the beat signal, or the value obtained by multiplying the noise floor level by the predetermined coefficient and the stationary noise threshold as the noise threshold, the proper noise threshold can be set even when the noise performance of a receiver has a frequency dependence. In addition, false extraction of a noise peak generated by the interference from an object vehicle as the target peak can be prevented.

(5) Regarding beams in a plurality of azimuths, when peaks exceeding the noise threshold exist in the frequency spectrums of beams adjacent to a specified beam, the same target is normally captured by the beams over the plurality of azimuths. Accordingly, when a peak below the noise threshold in the specified beam on the assumption that the target generated by the peak exists is detected, by performing processing in accordance with regarding the peak in the specified beam as being caused by the target, target peak disappearance due to the increase of the noise threshold can be prevented.

Reference Numerals

17-DSP
ADC-AD converter
DAC-DA converter
VCO-Voltage-controlled oscillator

DETAILED DESCRIPTION OF THE INVENTION

A configuration of a radar according to a first embodiment will be described with reference to FIGS. 1 to 8.

Figure 1:
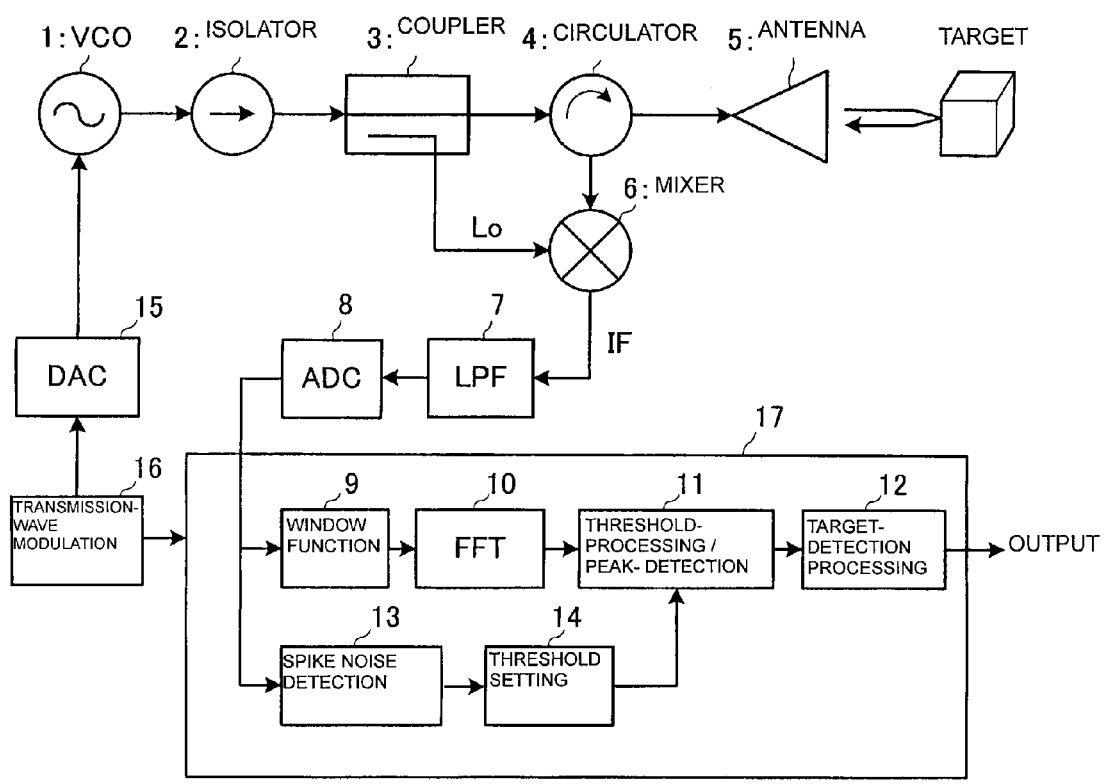
FIG. 1 is a block diagram showing an entire configuration of a radar according to a first embodiment.

FIG. 1 is a block diagram showing the entire configuration of the radar. A transmission-wave-modulating unit 16 sequentially outputs digital data of a modulation signal to a DA converter 15. A VOC 1 changes an oscillation frequency in response to a control voltage output from the DA converter 15. This allows frequency modulation using a continuous triangular waveform on the basis of the oscillation frequency of the VOC 1. An isolator 2 transfers an oscillated signal from the VOC 1 to a coupler 3 and blocks an incoming reflected signal to the VOC 1. The coupler 3 transfers the signal through the isolator 2 to a circulator 4 and supplies a part of a transmission signal as a local signal Lo to a mixer 6 in a predetermined distribution ratio. The circulator 4 transfers the transmission signal to an antenna 5 and supplies a reception signal from the antenna 5 to the mixer 6. The antenna 5 transmits the transmission signal, which is a continuous wave frequency-modulated by the VOC 1, and receives a reflected signal from the same direction. Additionally, the antenna 5 scans beams by periodically changing the direction of the beam from the antenna 5 over the range of predetermined detection angles.

The mixer 6 mixes the local signal Lo from the coupler 3 and the reception signal from the circulator 4 to output an intermediate-frequency signal IF. A low-pass filter 7 removes unnecessary harmonic components from the intermediate-frequency signal IF. The AD converter 8 converts the signal to a sampling data row and supplies the sampling data row to a DSP (digital signal processor) 17.

The DSP 17 temporarily stores at least one piece of scan data (data defining a plurality of beams scanned in the range of the predetermined detection angles) of the sampling data row converted in the AD converter 8 and calculates the direction of a target, the distance to the target, and the velocity of the target using processing described later.

In the DSP 17, a windowing-function-processing unit 9 performs windowing (extracting) of the sampling data row using a predetermined windowing function. An FFT-operation unit 10 analyzes frequency components of the data in the above-described sampling interval to which the windowing function is applied using an FFT operation.

A spike-noise-detecting unit 13 detects whether spike noise is included or not in the sampling interval extracted from the input sampling data row in order to determine a frequency spectrum. A threshold-setting unit 14 sets a proper noise threshold (hereinafter, referred to as a "threshold") on the basis of detection or non-detection of the spike noise in order to extract a peak (hereinafter, referred to as a "target peak") from the frequency spectrum (power spectrum), the target peak being generated by receiving a reflected signal from the target.

A threshold-processing and peak-detecting unit 11 extracts the frequency and the peak value of each target peak exceeding the threshold from the power spectrum on the basis of the threshold set in the threshold-setting unit 14.

A target-detecting unit 12 calculates the distance to the target and the velocity of the target on the basis of the peak frequency of the detected target peak.

Figure 2:
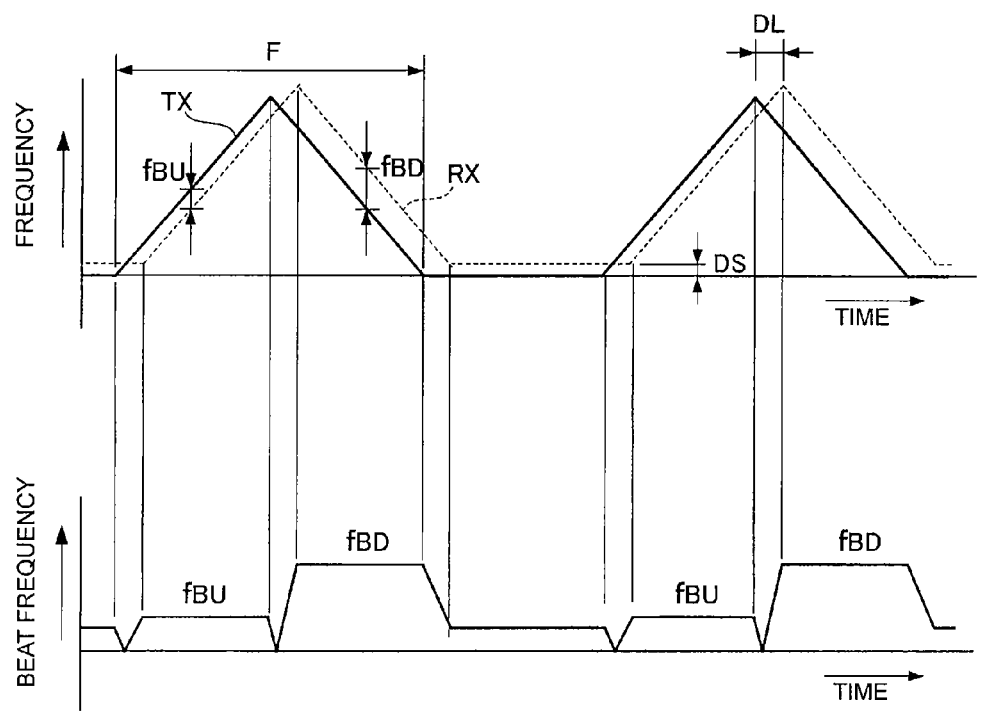
FIG. 2 is a graph showing an example of frequency change of a reception signal and a transmission signal that change by a distance from the radar to a target and the relative velocity of the target.

FIG. 2 shows an example of a shift of frequency change of the transmission and reception signals, the shift being caused by the distance to the target and the relative velocity. A transmission signal TX includes repetition of frames F each including an upstream modulation interval in which the frequency increases and a downstream modulation interval in which the frequency decreases. A frequency difference between the transmission signal and a reception signal RX in a case where the frequency of the transmission signal TX increases is an upbeat frequency fBU, and a frequency difference between the transmission signal and the reception signal in a case where the frequency of the transmission signal decreases is a downbeat frequency fBD. A shift DL on the time axis (time difference) between the triangular wave of the transmission signal TX and the triangular wave of the reception signal RX corresponds to the round-trip time of the electric wave from the antenna to the target. Additionally, a shift on the frequency axis between the transmission signal and the reception signal is a Doppler shift amount DS caused by the relative velocity of the target to the antenna. The values of the upbeat and downbeat frequencies fBU and fBD are changed by the time difference and the Doppler shift amount. Conversely, by detecting the upbeat and downbeat frequencies fBU and fBD, the distance from the radar to the target and the relative velocity of the target to the radar are calculated.

Figure 3:
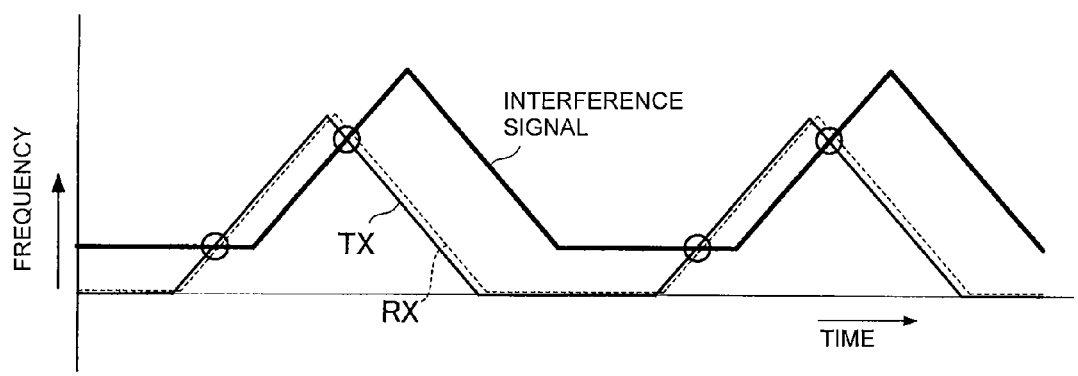
FIG. 3 is a graph showing an interference signal and a timing when spike noise is generated.
Figure 4:
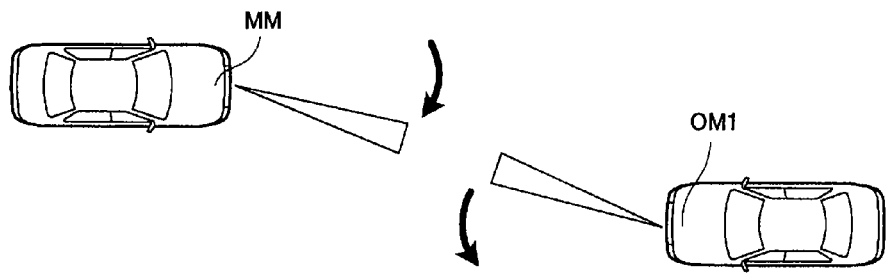
FIG. 4 includes drawings each showing an example of each type of pattern in which an interference is generated.
Figure 4:
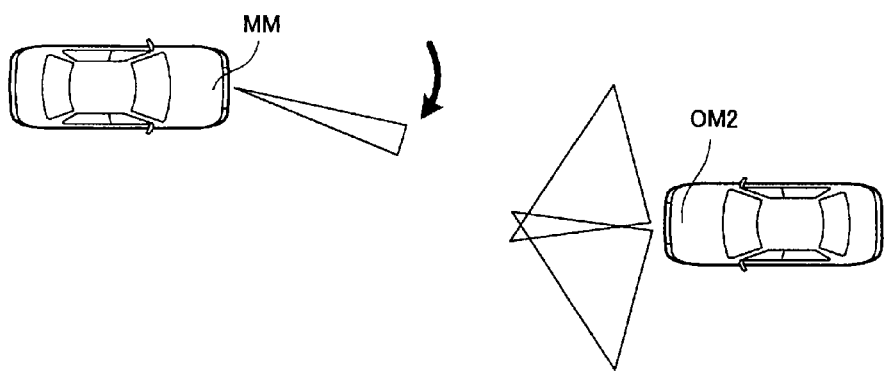
Figure 4:
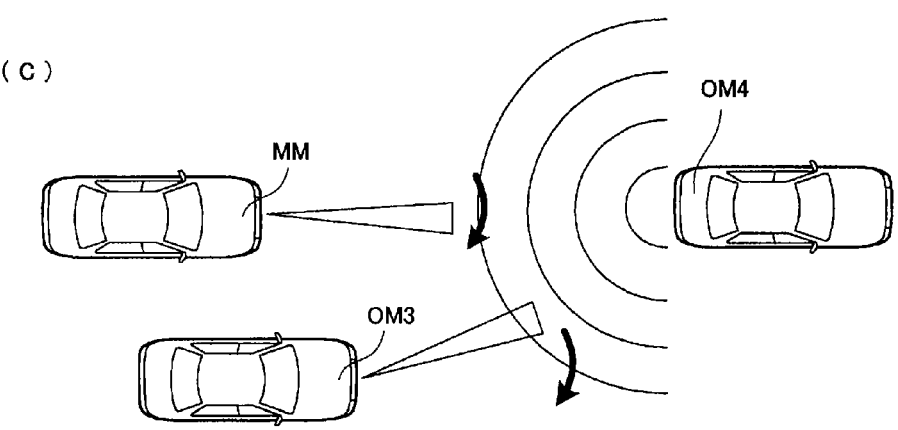

FIG. 3 indicates the transmission and reception signals, an interference signal, and generation of spike noise. As already described with reference to FIG. 4, in the case where an interference signal from an object vehicle exists, the interference signal from the object vehicle typically has a modulation frequency and a modulation phase that are largely shifted from those of the transmission signal of a subject vehicle. Accordingly, spike noise is superimposed on a beat signal at a timing when a frequency of the transmission signal TX of the subject vehicle substantially coincides with a frequency of the interference signal as indicated by the circular mark in the graph.

Figure 5:
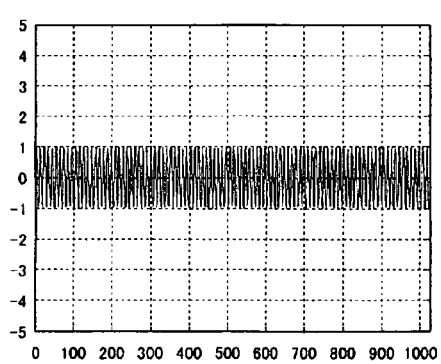
FIG. 5 includes graphs each showing an example of the spike noise superimposed on a beat signal and an example of a frequency spectrum difference due to the spike noise.
Figure 5:
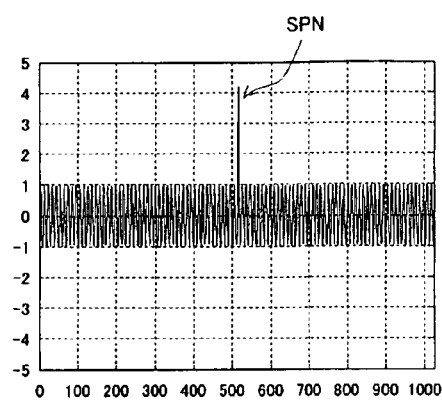
Figure 5:
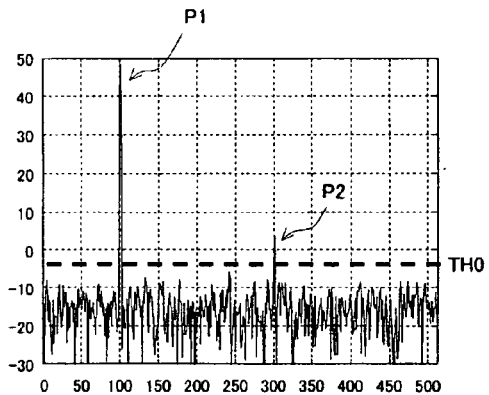
Figure 5:
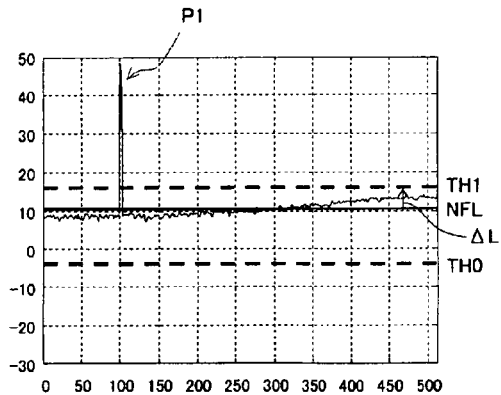

FIG. 5 includes examples of spike noise and a frequency spectrum difference with or without the spike noise. Both part (A) and part (B) of FIG. 5 are time-based waveforms each representing the beat signal. The horizontal axis indicates the first to $1024^{th}$ pieces of the sampling data extracted on a time basis, and the vertical axis indicates a normalized voltage. In the case of no interference signal shown in FIG. 3, or at a timing when the frequency difference between the transmission signal and the interference signal is large, the beat signal shown in part (A) of FIG. 5 can be obtained. When the frequency difference between the transmission signal and the interference signal falls within the frequency band of the intermediate-frequency signal, as shown in part (B) of FIG. 5, spike noise SPN is superimposed on the beat signal.

Part (C) of FIG. 5 is the frequency spectrum of the beat signal shown in part (A) of FIG. 5, and part (D) of FIG. 5 is the frequency spectrum of the beat signal shown in part (B) of FIG. 5. In the both graphs, the horizontal axis indicates a frequency (frequency bin of the FFT), and the vertical axis indicates a signal level (dB). In a steady state in which the spike noise SPN is not superimposed on the beat signal, a target peak P1 and a target peak P2 each having a high peak value, and the like appear as shown in part (C) of FIG. 5 at a comparatively low-noise level (background noise). By setting a threshold TH0 exceeding the noise level, a peak exceeding the threshold TH0 can be extracted as the target peak.

In contrast, when the spike noise SPN is superimposed on the beat signal as shown in part (B) of FIG. 5, the entire noise level in the frequency spectrum increases as shown in part (D) of FIG. 5. The increase of the noise level results from the existence of the spike noise SPN in the sampling data which is a processing object of the FFT, and the level is referred to as a noise floor level NFL. Because the power of the spike noise SPN is equally dispersed over the entire frequency band on the frequency axis, the noise floor level does not become extremely high. In a normal range of distance that can be detected, the noise floor level NFL does not become so high as to exceed the peak value of the target peak P1 obtained from a comparatively large target such as a vehicle.

Then, a value obtained by adding a predetermined value ΔL to the noise floor level NFL is set as a new threshold TH1. The increased component from the original threshold TH0 to the threshold TH1 is determined on the basis of the maximum absolute value (amplitude) of the spike noise SPN superimposed on the beat signal.

The probability that a plurality of spike noises are superimposed in the sampling data row that is the processing object of the FFT is low, and the duration of the spike noise falls within one piece to a few pieces of the sampling data. Accordingly, the maximum absolute value of the spike noise SPN and the noise floor level appearing in the frequency spectrum influenced by the spike noise are estimated as [the maximum absolute value of the amplitude of the spike noise SPN]/[the number of pieces of the sampling data]. Thus, the noise floor level NFL can be estimated from the maximum absolute value of the spike noise, and the value obtained by adding the predetermined value to the estimated noise floor level can be set as the proper threshold TH1.

Instead of adding the predetermined ΔL to the noise floor level NFL, a new threshold may be determined by multiplying the noise floor level NFL by a predetermined coefficient.

Figure 6:
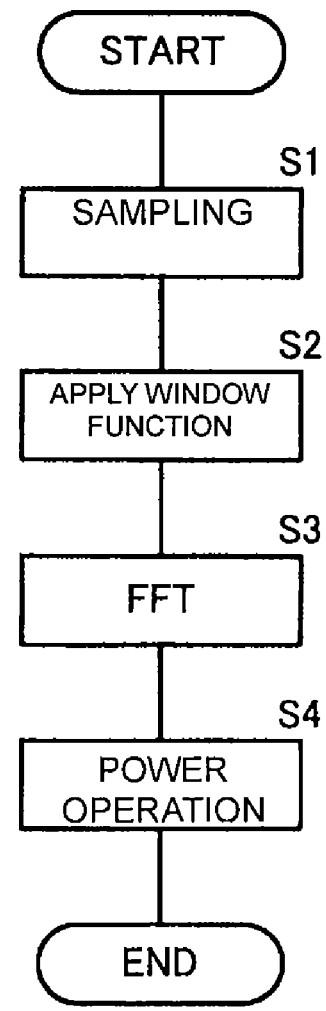
FIG. 6 is a flowchart showing a procedure of frequency analysis in the radar.
Figure 7:
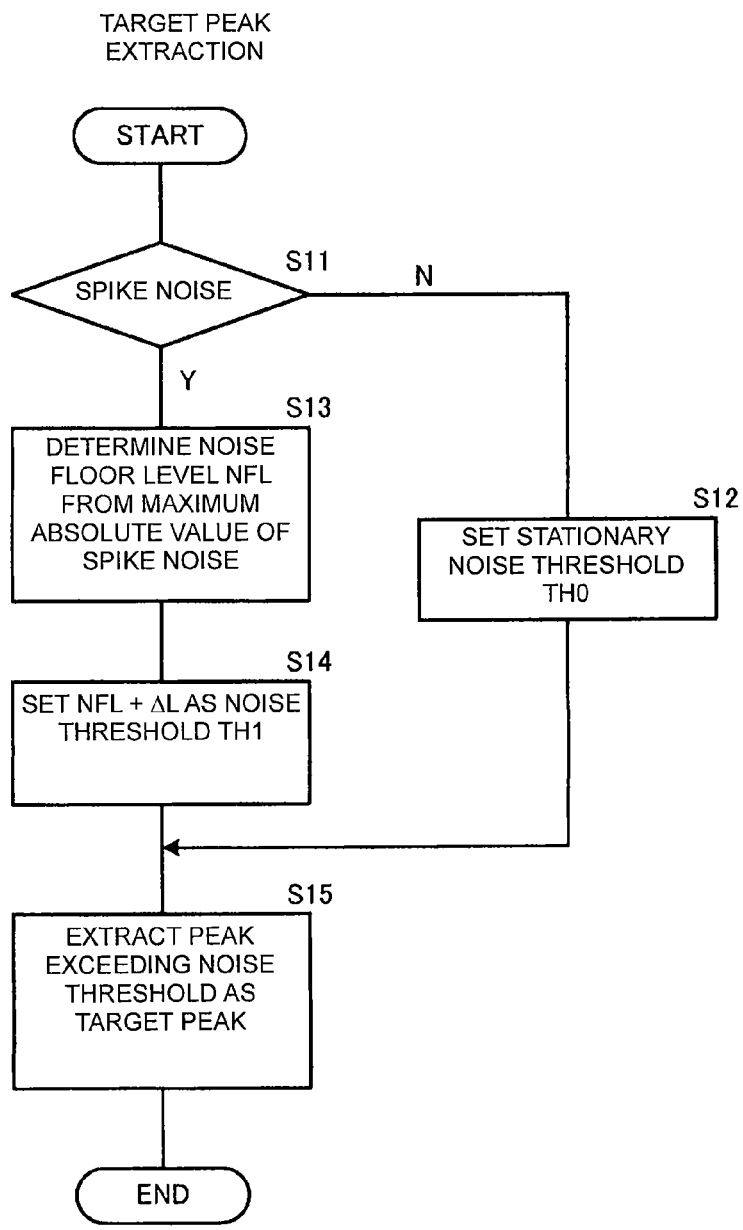
FIG. 7 is a flowchart showing a procedure of target peak extraction in the radar.
Figure 8:
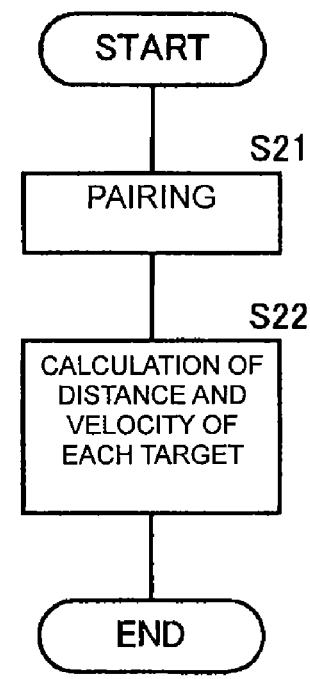
FIG. 8 is a flowchart showing a procedure of target peak detection in the radar.

FIGS. 6 to 8 each show a processing flow of the DSP 17 shown in FIG. 1 as a flowchart.

FIG. 6 shows a processing flow of the frequency analysis. Data is sampled in a range of the digital data row converted by the AD converter 8, the range including the processing object, and the windowing function is applied to the data (S1→S2). The FFT operation is performed for the predetermined number of pieces of data (S3). Then, the square root of the squared sum of the imaginary and real parts of each determined frequency bin is calculated to obtain the power spectrum (S4).

FIG. 7 shows a processing procedure of target peak extraction. When no spike noise is detected in the data row that is the processing object of the FFT, a stationary threshold (TH0 in the example shown in FIG. 5) is set (S11 →S12). A peak exceeding the threshold TH0 (P1 and P2 in the example shown in part (C) of FIG. 5) is extracted as the target peak (S15).

When the target peak is detected, the noise floor level NFL is determined from the maximum absolute value of the spike noise SPN (S13). Then, the value obtained by adding the predetermined value ΔL to the noise floor level NFL is set as the threshold TH1 (S14). On the basis of the threshold TH1, the peak P1 exceeding the threshold TH1 is extracted as the target peak (S15).

In the example shown in FIG. 5, since the spike noise SPN is superimposed on the beat signal, the noise floor level of the frequency spectrum is increased and the threshold is increased, so that the target peak P2 appearing in part (C) of FIG. 5 is not extracted. However, in most cases, such a target with a low peak corresponds to an object located remotely, an object located above the optical axis of the radar, such as a sign, a roadside tree, or the like, and the target is insignificant and only masked for a short time (an interval in which the spike noise appears). Accordingly, the things described above do not immediately become problems.

FIG. 8 shows a processing procedure of target detection. First, pairing is performed on the basis of the frequencies and the peak values of target peaks extracted in the upstream modulation and downstream modulation intervals (S21). Then, the distance and the velocity of each target are calculated using a pair of the frequency and the peak value of the peak and output (S22).

Next, a radar according to a second embodiment will be described with reference to FIGS. 9 to 11.

Figure 9:
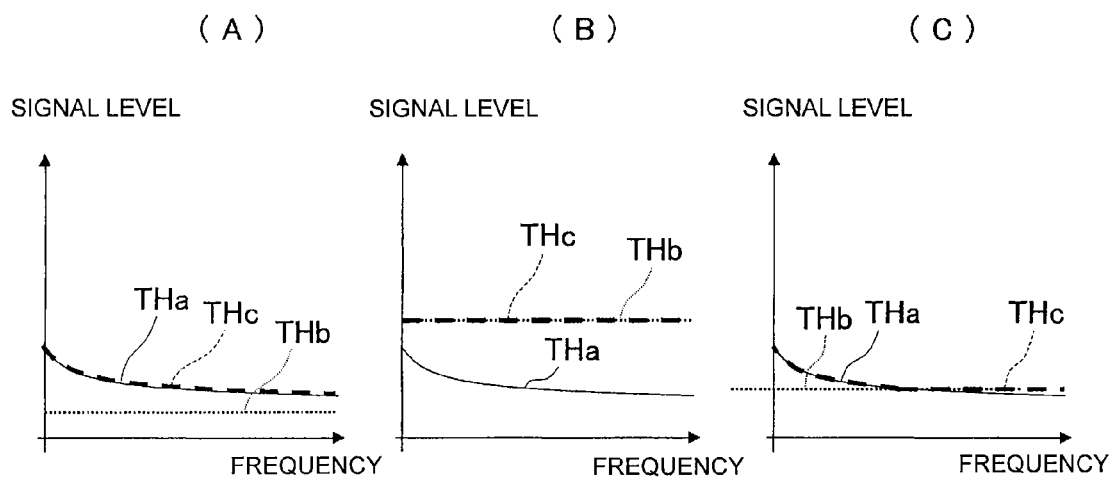
FIG. 9 includes graphs each showing an example of two thresholds applied to a radar according to a second embodiment and a threshold which is determined on the basis of the two thresholds and is finally applied.

FIG. 9 shows setting examples of thresholds for extracting the target peak from the frequency spectrum. Here, the curve THa represents a stationary threshold set in accordance with the noise performance of a receiver. The straight line THb represented by the broken line is a threshold obtained by adding a predetermined value to the noise floor level determined from the maximum absolute value (amplitude) of the spike noise. The curve THc, represented by the dotted line, is a value determined finally on the basis of the two thresholds THa and THb. The larger one of the stationary threshold THa and the threshold THb [determined as the noise floor level+ the predetermined value] is employed as the threshold THc.

Accordingly, as shown in part (A) of FIG. 9, when the threshold THb is below the stationary threshold THa over all the frequencies, the threshold THc employed finally is equal to the stationary threshold THa. As shown in part (B) of FIG. 9, when the threshold THc, which is determined as the noise floor level+the predetermined value, is above the stationary threshold THa over all the frequencies, the threshold THc applied finally is equal to the THb. Furthermore, as shown in part (C) of FIG. 9, when the thresholds THa and THb intersect, the threshold THc applied finally is the stationary threshold THa in the low frequency side where the frequencies are lower than the point of intersection of the THa and THb and the threshold THb [determined as the noise floor level+the predetermined value] in the high frequency side.

As described above, by setting the applied threshold THc with consideration of both the stationary threshold THa in accordance with the distance from the target and the threshold THb determined using the spike noise, the occurrence of falsely detecting the noise superimposed over the short distance (low frequency side) as the target peak decreases. In addition, the occurrence of falsely detecting many peaks caused by the spike noise as the target peaks decreases in the high frequency side.

Figure 10:
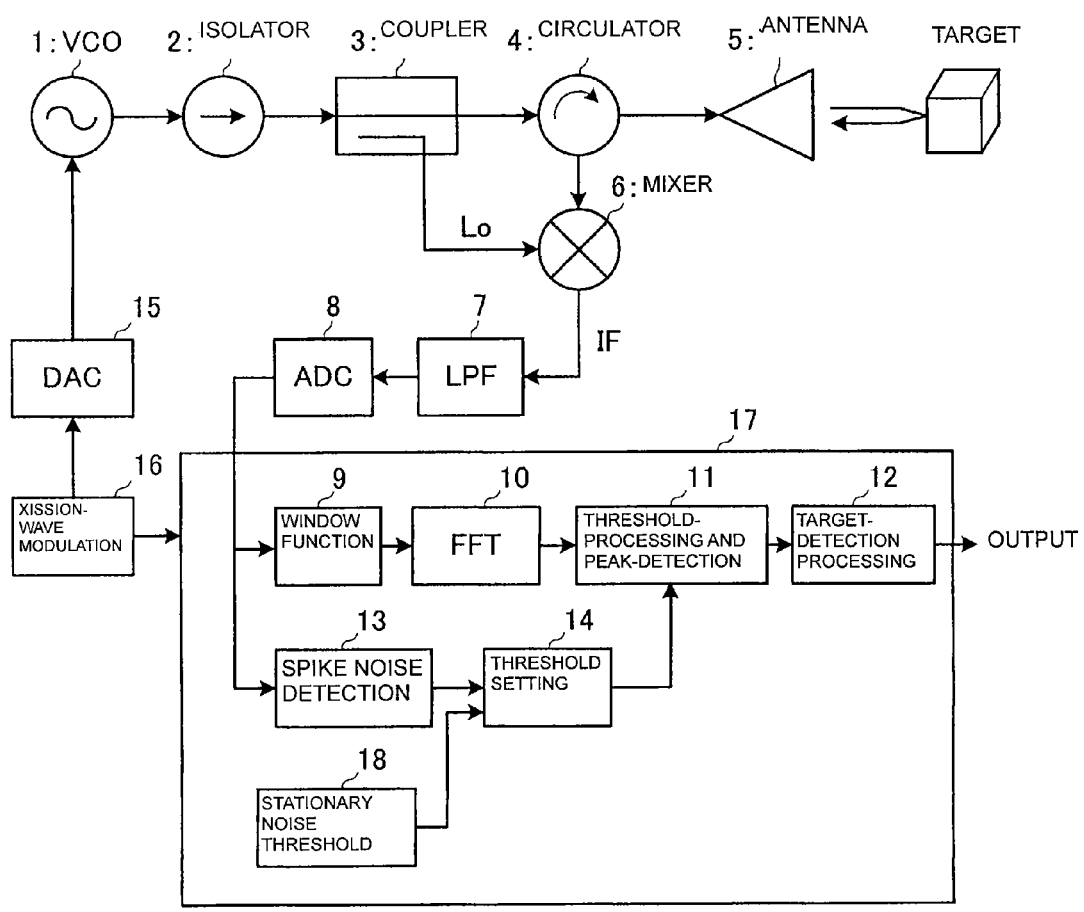
FIG. 10 is a block diagram showing an entire configuration of the radar.

FIG. 10 is a block diagram showing a configuration of the radar according to the second embodiment. Unlike the configuration shown in FIG. 1, in the processing of the threshold-setting unit 14 in the DSP 17, the threshold THc applied finally is set as described above by determining the value of [the noise floor level NFL+the predetermined value ΔL] from the maximum absolute value of the spike noise detected in the spike-noise-detecting unit 13 and comparing the value of [the noise floor level NFL+the predetermined value ΔL] with a value from a stationary-noise-threshold-setting unit 18. The others in the configuration are the same as those in the configuration shown in FIG. 1.

Figure 11:
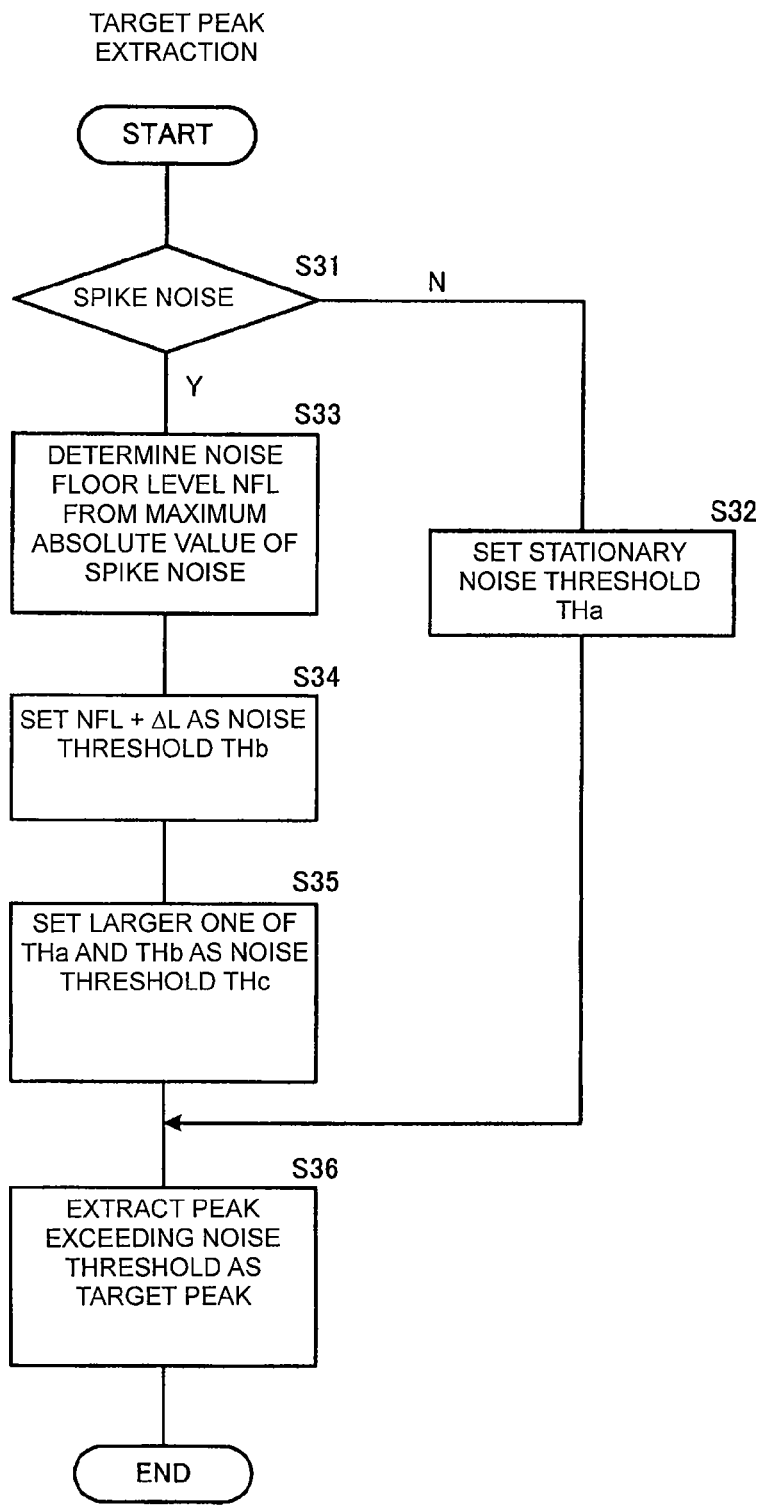
FIG. 11 is a flowchart showing a procedure of target peak extraction in the radar.

FIG. 11 is a flowchart showing a processing procedure of target peak extraction performed in the DSP 17 shown in FIG. 10. When no spike noise is detected in the data row that is the processing object of the FFT, the stationary threshold THa is set (S31→S32). Then, a peak exceeding the threshold THa is extracted as the target peak (S36).

When the spike noise is detected, the noise floor level NFL is determined from the maximum absolute value of the spike noise SPN (S33). The value obtained by adding the predetermined value ΔL to the noise floor level NFL is set as the threshold THb (S34). The larger one of the thresholds THa and THb is set as the threshold THc (S35). Then, a peak exceeding the threshold THc is extracted as the target peak on the basis of the threshold THc (S36).

Next, a radar according to a third embodiment will be described with reference to FIGS. 12 to 14.

The radar according to the third embodiment does not include means for detecting the superimposition of the spike noise, and a proper threshold is set on the basis of the maximum absolute value of the beat signal.

Figure 12:
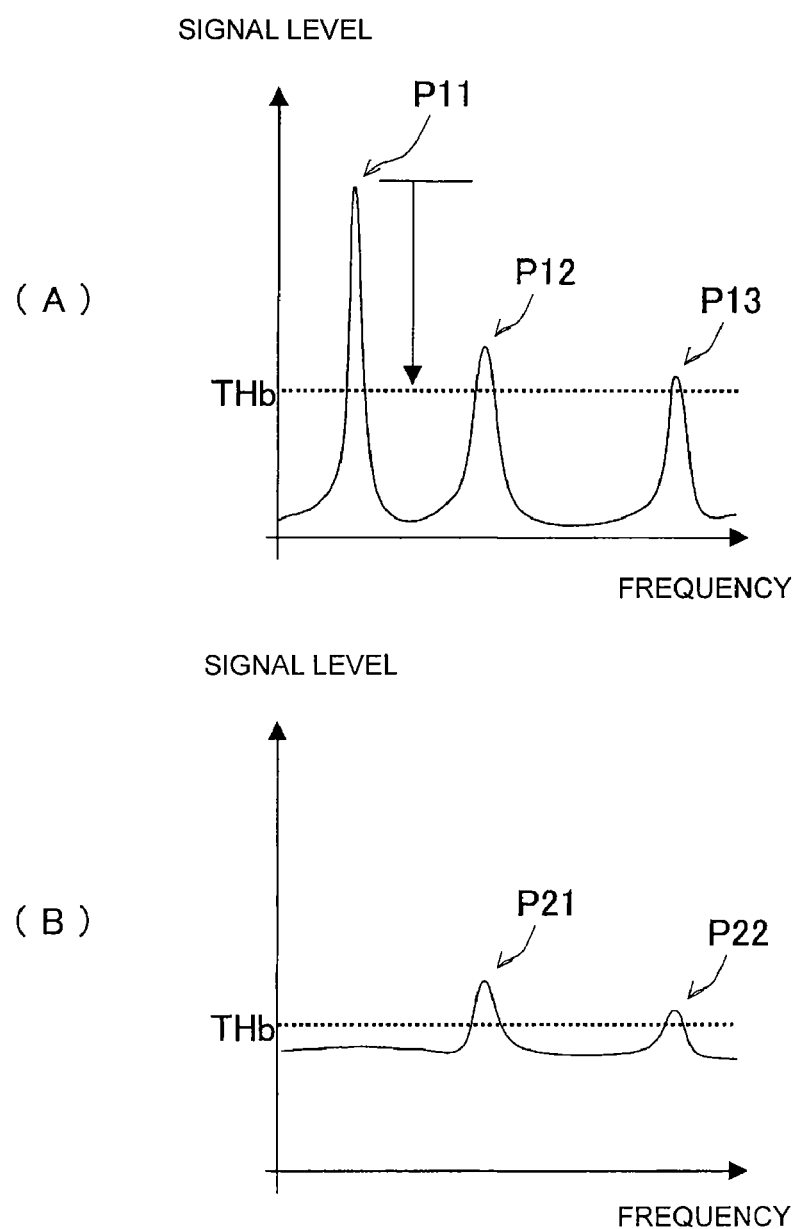
FIG. 12 includes graphs each showing the relationship between a frequency spectrum and a threshold obtained by a radar according to a third embodiment.

FIG. 12 includes setting examples of the threshold. Both of part (A) and part (B) are the frequency spectrums of beat signals, and the horizontal axis indicates a frequency and the vertical axis indicates a signal level. When the spike noise is not superimposed on the beat signal, the maximum absolute value of the beat signal is the maximum point of the amplitude of a sinusoidal wave. The noise floor level NFL (in a case where the maximum absolute value is assumed as the spike noise) is estimated on the basis of the maximum absolute value, and a value obtained by adding the predetermined value ΔL to the maximum absolute value is determined as the threshold THb. In this case, the spectrum level of the sinusoidal wave signal included in the beat signal is approximately [the number of pieces of the sampling data]/$\sqrt{2}$ times (724 times ≈57 dB in a case where the number of the sampling points is 1024) compared with the noise floor level NFL which has the same amplitude and is determined using the spike noise and ensures a sufficient dynamic range. Accordingly, peaks P11, P12, and P13 exceeding the threshold THb can be extracted as the target peaks.

In contrast, when the spike noise is superimposed on the beat signal, the maximum absolute value of the spike noise is extracted as the maximum absolute value of the beat signal. The threshold THb determined from the maximum absolute value is set higher by a predetermined value than the noise floor level NFL determined using the spike noise. Accordingly, noise which is caused by the spike noise and appears on the frequency spectrum is not extracted as the target peak by mistake, and proper target peaks P21 and P22 can be extracted.

Figure 13:
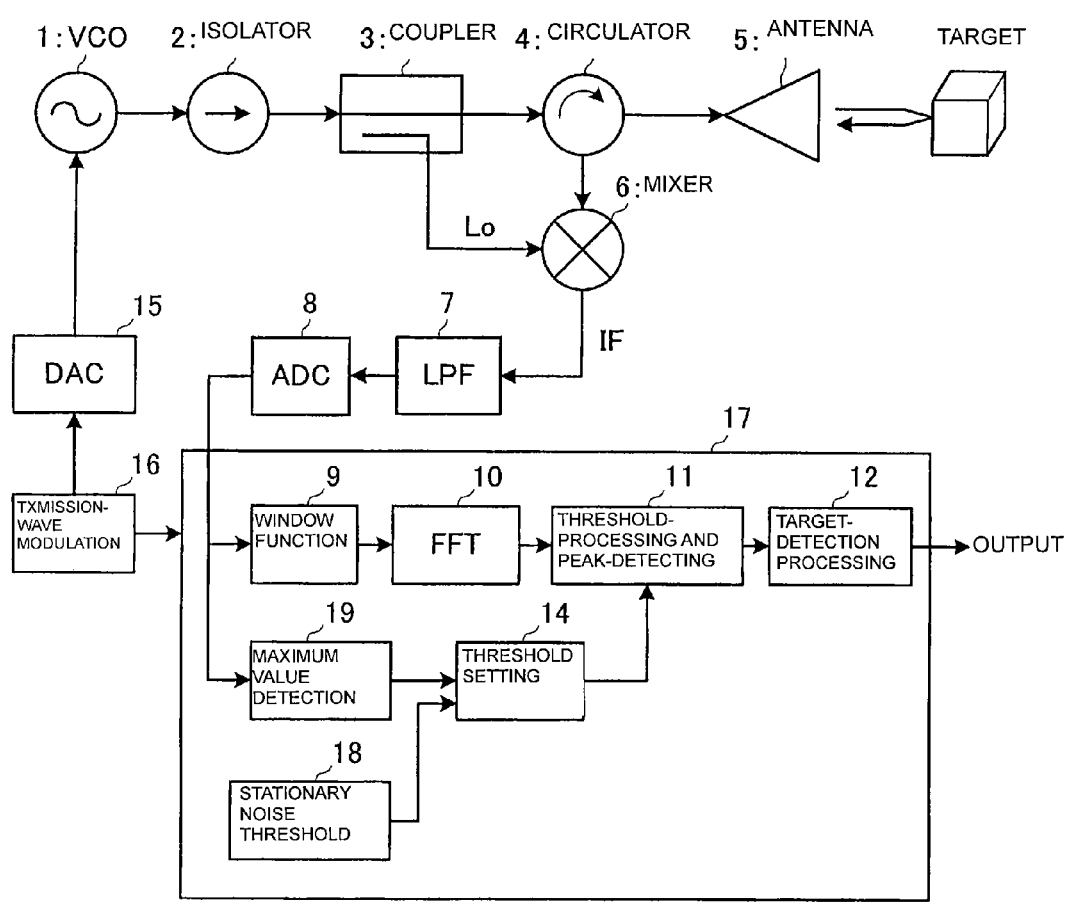
FIG. 13 is a block diagram showing an entire configuration of the radar.

FIG. 13 is a block diagram showing a configuration of the radar according to the third embodiment. Unlike the configuration shown in FIG. 1, a maximum-value-detecting unit 19 detects the maximum absolute value of the data from the sampling data row that is obtained in the AD converter 8 and is the processing object of the FFT. The threshold-setting unit 14 determines the noise floor level on the basis of the maximum value in a case where the maximum value is assumed as the spike noise and sets a value obtained by adding the predetermined value $\Delta L$ to the noise floor level NFL as the threshold THb. The others in the configuration are the same as those shown in FIG. 10.

Figure 14:
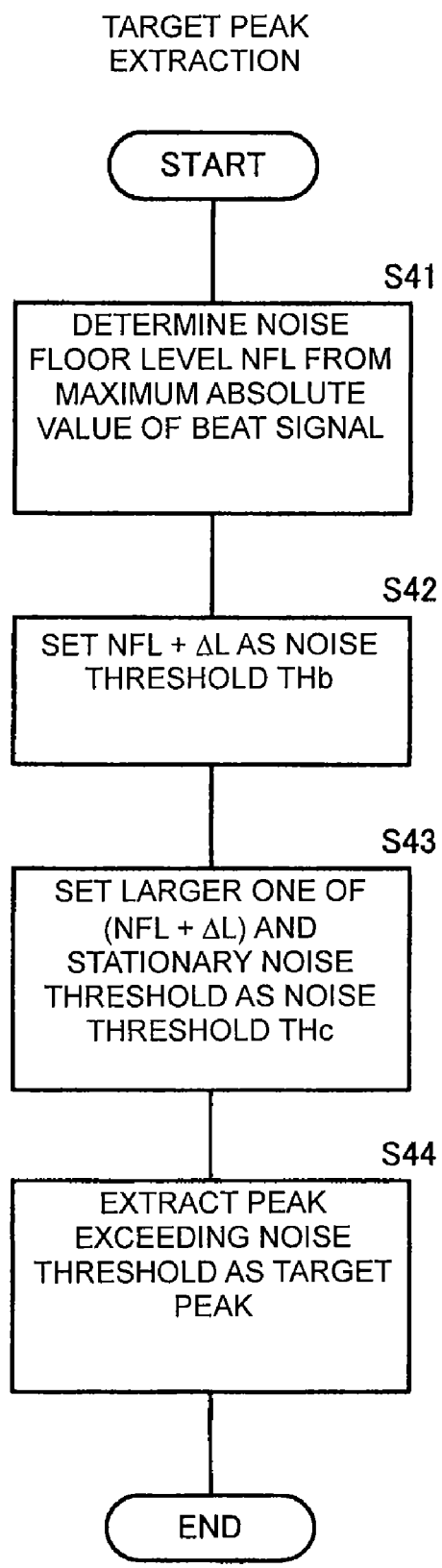
FIG. 14 is a flowchart showing a procedure of target peak extraction in the radar.

FIG. 14 is a flowchart of target peak extraction in the processing performed in the DSP 17 shown in FIG. 13. First, the noise floor level NFL is determined from the maximum absolute value of the beat signal (S41). The value obtained by adding the predetermined value $\Delta L$ to the noise floor level NFL is set as the threshold THb (S42). The larger one of the threshold THb and the stationary threshold THa is set as the threshold (S43). A peak exceeding the threshold is extracted as the target peak (S44).

As the applied threshold, the threshold THb determined on the basis of the maximum absolute value of the beat signal may be used instead of the stationary threshold THa.

Next, a radar according to a fourth embodiment will be described with reference to FIGS. 15 and 16.

Figure 15:
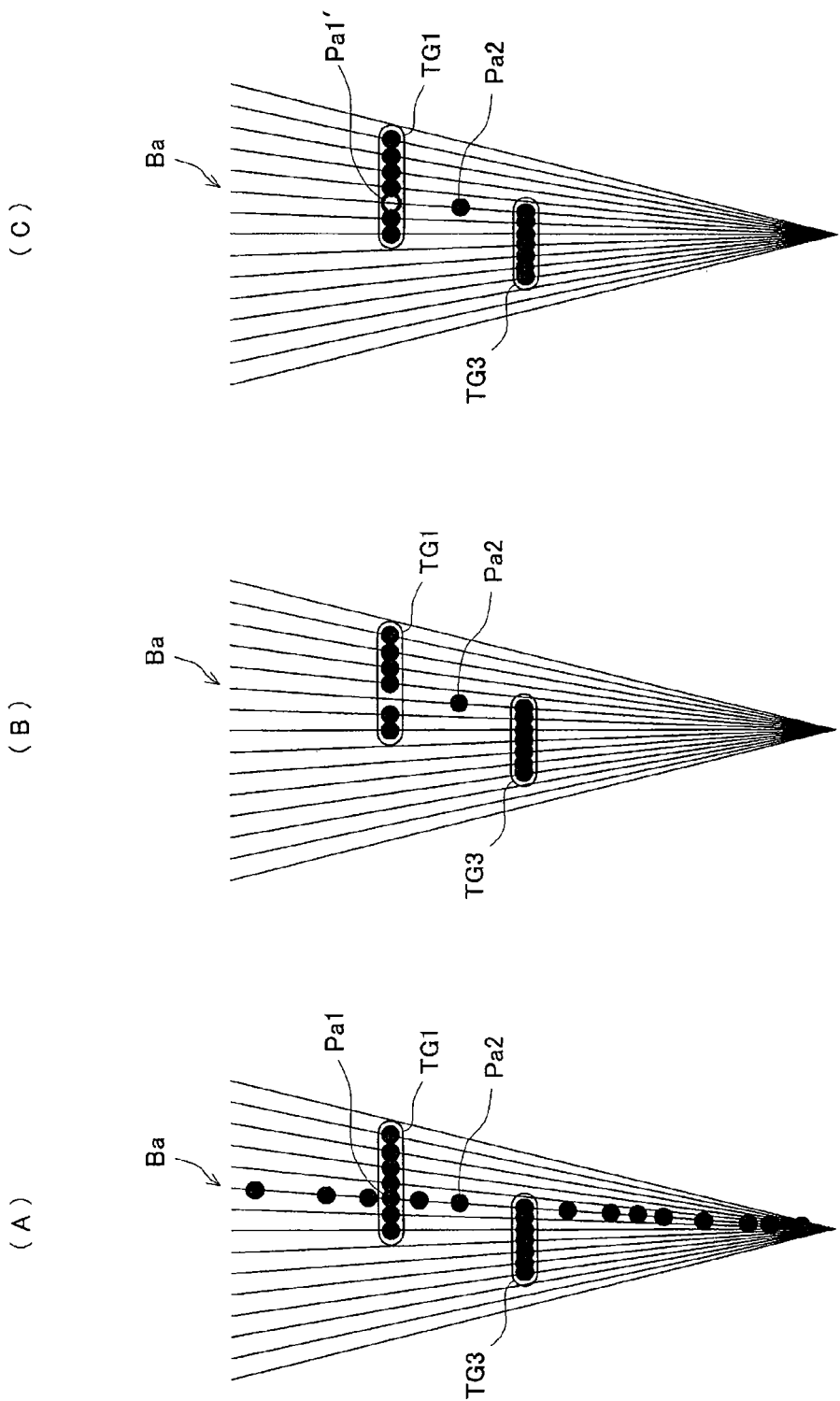
FIG. 15 includes graphs showing the relationship between threshold changes and extracted peaks, and the like obtained by a radar according to a fourth embodiment.

Referring to FIG. 15, in a case where the radar scans beams of electromagnetic waves in the azimuthal direction, the location of a peak appearing in (extracted from) the frequency spectrum of each of the beams is represented by a filled dot as a location in the range direction of the beam.

Here, a beam Ba is a beam having an interference, and when a peak is extracted from the frequency spectrum using the stationary threshold regardless of the presence or absence of the interference, many peaks are extracted by mistake.

As already shown in each of the embodiments, in the case where the spike noise is superimposed on the beat signal, by increasing the threshold with consideration of the increased component of the noise floor level appearing in the frequency spectrum, the false detection of noise as the peak can be prevented also for the beam Ba having the interference as shown in part (B) of FIG. 15, and a proper target peak Pa2 can be extracted.

However, because the level of a reception signal that is a reflected signal from a target located remotely (target TG1 in the example) is low, a peak (peak Pa1 shown in part (A) of FIG. 15) may be not extracted by setting the threshold higher as shown in part (B) of FIG. 15. In this case, the presence or absence of a peak that is in a specified beam and becomes below the threshold due to the increase of the threshold is detected at substantially the same frequency of the above-described peak, and the peak in the specified beam is processed in accordance with regarding the peak in the specified beam as the target peak when the peak in the specified beam is detected. A peak Pa1' shown in part (C) of FIG. 15 is the target peak restored in such a manner.

Figure 16:
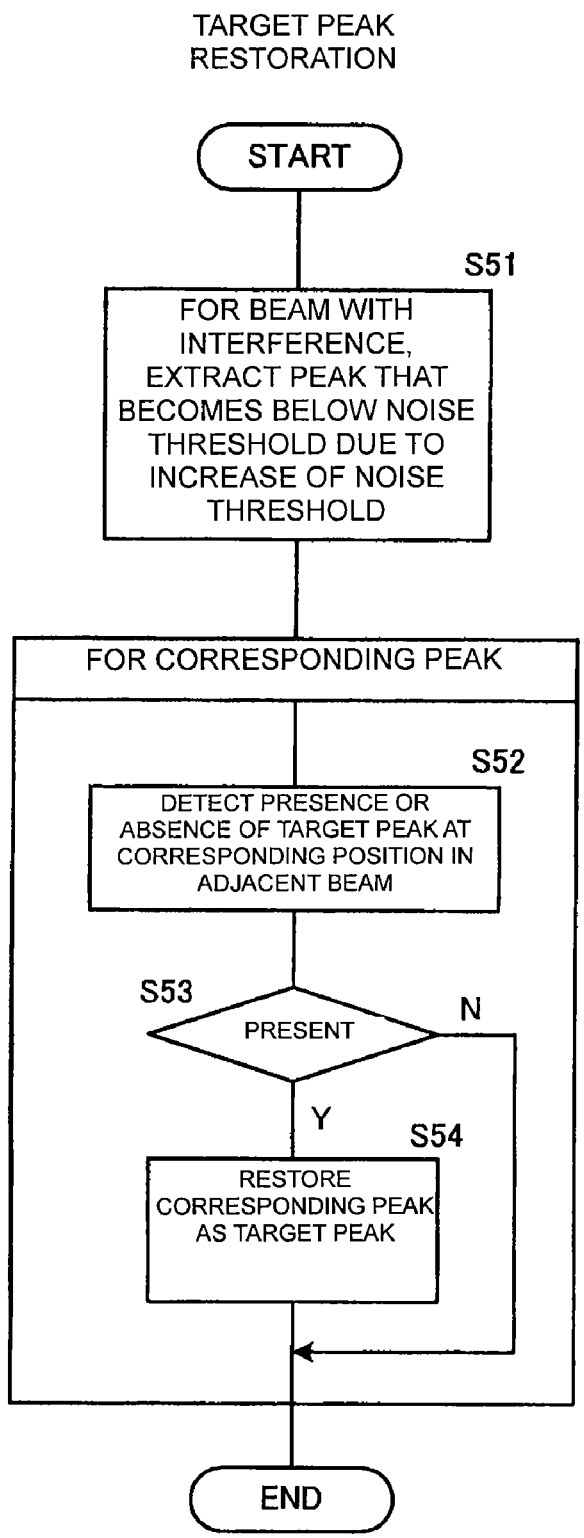
FIG. 16 is a flowchart showing a procedure of target peak restoration in the radar.

FIG. 16 is a flowchart showing the target peak restoration. First, peaks that becomes below the threshold due to the increase of the threshold are extracted from the beam having the interference (beam in which it is detected that the spike noise is superimposed on the beat signal) (S51). Then, for the peaks, the presence or absence of the target peak in the frequency spectrum, which is obtained at substantially the same distance from one of the peaks, of a beam adjacent to the specified beam with the interference in the azimuthal direction is detected (S52). When the target peak in the beam adjacent to the specified beam with the interference exists, a corresponding one of the peaks in the specified beam with the interference is restored as the target peak (S53→S54).

In this manner, even in the case of the beam with the interference, the probability that noise is detected as the target peak by mistake can be reduced. This can also prevent the target peak disappearance due to the increase of the threshold.

Furthermore, in the example shown in part (B) of FIG. 15, if nothing is done, an object which is primarily a single target (target TG1) may be falsely recognized as two targets in the later processing because of the disappearance of the peak Pa1 in the beam Ba with the interference. However, due to the restoration of the peak Pa1' as shown part (C) of FIG. 15, the target TG1 can be processed as the primarily single target.

The invention claimed is:

1. A radar comprising:
    a transmitter that transmits a transmission signal having repetition of modulation intervals in which a frequency gradually changes in a predetermined frequency range with time;
    a receiver that receives a reflected signal of the transmission signal from a target;
    a frequency spectrum unit that obtains a frequency spectrum of a beat signal of the transmission signal and the reflected signal;
    a spike noise detector that detects whether spike noise is superimposed on the beat signal;
    a noise threshold setting unit that increases a noise threshold when superimposition of the spike noise is detected; and
    a detecting unit that detects information of the target based on data exceeding the noise threshold among data defining the frequency spectrum,
    wherein the noise threshold setting unit estimates a noise floor level of the frequency spectrum on the basis of a maximum absolute value of an amplitude of the spike noise included in the beat signal and sets a value obtained by adding a predetermined value to the noise floor level or a value obtained by multiplying the noise floor level by a predetermined coefficient as the noise threshold.

2. The radar according to claim 1, wherein the noise threshold setting unit sets a stationary noise threshold in accordance with a frequency of the frequency spectrum and sets a larger one of the value obtained by adding the predetermined value to the noise floor level or the value obtained by multiplying the noise floor level by the predetermined coefficient and the stationary noise threshold as the noise threshold, the noise floor level being estimated on the basis of an amplitude of the beat signal.

3. A radar comprising:
    a transmitter that transmits a transmission signal having repetition of modulation intervals in which a frequency gradually changes in a predetermined frequency range with time;
    a receiver that receives a reflected signal of the transmission signal from a target;

a frequency spectrum unit that obtains a frequency spectrum of a beat signal of the transmission signal and the reflected signal;

a spike noise detector that detects whether spike noise is superimposed on the beat signal;

a noise threshold setting unit that increases a noise threshold when superimposition of the spike noise is detected; and a detecting unit that detects information of the target based on data exceeding the noise threshold among data defining the frequency spectrum, wherein the transmitter transmits the transmission signal and the receiver receives the reception signal in a plurality of different azimuths, the transmission and reception being performed for each of the signals, and the radar further comprises a data processing unit that detects the presence or absence of a peak below the noise threshold at substantially the same frequency of the peak in a signal adjacent to a specified signal when a peak exceeding the noise threshold is included in the frequency spectrum of the signal adjacent to the specified signal, and that performs processing in accordance with regarding the peak in the specified signal as being caused by the target when the presence of the peak in the specified signal is detected.

4. A radar comprising:

a transmitter that transmits a transmission signal having repetition of modulation intervals in which a frequency gradually changes in a predetermined frequency range with time;

a receiver that receives a reflected signal of the transmission signal from a target;

a frequency spectrum unit that obtains a frequency spectrum of a beat signal of the transmission signal and the reflected signal;

a noise threshold setting that estimates a noise floor level of the frequency spectrum on the basis of a maximum absolute value of an amplitude of the beat signal and sets a value obtained by adding a predetermined value to the noise floor level or a value obtained by multiplying the noise floor level by a predetermined coefficient as the noise threshold; and a detecting unit that detects information of the target based on data exceeding the noise threshold among data defining the frequency spectrum.

5. The radar according to claim 4, wherein the noise threshold setting unit sets a stationary noise threshold in accordance with a frequency of the frequency spectrum and sets a larger one of the value obtained by adding the predetermined value to the noise floor level or the value obtained by multiplying the noise floor level by the predetermined coefficient and the stationary noise threshold as the noise threshold, the noise floor level being estimated on the basis of an amplitude of the beat signal.

6. The radar according to claim 5, wherein the transmitter transmits the transmission signal and the receiver receives the reception signal in a plurality of different azimuths, the transmission and reception being performed for each of the signals, and the radar further comprises a data processing unit that detects the presence or absence of a peak below the noise threshold at substantially the same frequency of the peak in a signal adjacent to a specified signal when a peak exceeding the noise threshold is included in the frequency spectrum of the signal adjacent to the specified signal, and that performs processing in accordance with regarding the peak in the specified signal as being caused by the target when the presence of the peak in the specified signal is detected.

\* \* \* \* \*